UNITED STATES PATENT OFFICE.

EDWARD M. COOK, OF NEW YORK, N. Y.

TREATING RESIDUES OF DISTILLATION.

SPECIFICATION forming part of Letters Patent No. 439,639, dated November 4, 1890.

Application filed February 19, 1890. Serial No. 341,051. (No specimens.)

*To all whom it may concern:*

Be it known that I, EDWARD M. COOK, a citizen of the United States, residing in the city, county, and State of New York, have invented a new and useful Process for the Treatment of the Residuums of Distillation of Grain and other Similar Residuums; and I do hereby declare that the following is a full, clear, and exact description of the invention, which will enable others skilled in the art to which it appertains to practice the same.

The present invention relates to the treatment of the semi-fluid residuums resulting from the distillation or other treatment of grain, as in the manufacture of alcohol, whisky, starch, yeast, and other grain products; and has for its object the separation from such residuums of the valuable or nutritious matter in a solid form, in which it can be easily handled and transported, and can be conveniently used for feeding to animals. These residuums contain a large amount of nutritious material, consisting of proteine and nitrogenous and starchy matters, which by any of the ordinary methods of filtration or pressing escape and become wholly or partially lost. This has been due to the fact that the nutritious material is largely in a viscous, glutinous, and tenacious condition, and either soon clogs the ordinary filter and stops its operation or passes through the filter with the fluid portion and is lost.

My invention consists in mixing a granular or pulverized material, which is itself nutritious, with the residuums and then subjecting the mass to filtration, with the effect that the added material operates as a filter to readily permit the fluid portions to pass through it, while it serves to retain the solid and nutritious portions.

In practicing my invention I mix with the residuums a sufficient proportion of solid nutritious material in a granular or pulverized condition—such as cornmeal, cotton-seed meal, rice-flour, or other equivalent nutritious material—and then subject the resulting mass or mixture to filtration by the employment of any apparatus suitable for separating solids from fluids—such as filter-presses, centrifugal extractors or presses, or filters of other construction. The proportion of granular or pulverized material necessary to accomplish the result—that is, to effect the separation of the solids from the fluids—will necessarily vary considerably on account of the variation in the condition of the residuums, as well as in the quality of the granular or pulverized material added. Some residuums are in a much more fluid condition than others, and for this reason require the addition of a larger proportion of granular or pulverized material. I have found that the addition of two per centum of the granular material has been sufficient in many cases to give the desired result, in others it has been necessary to use as high as ten per centum.

By the use of the method above described I find that the residuums which heretofore could not be separated in a large and economical way are readily separated, the solid nutritious material being left behind while the fluids are passed off. I consider it essential to the effective operation of this process that the granular or pulverized nutritious material introduced shall be of such mechanical condition and specific gravity that it will be held in suspension in the residuums to be treated until it is brought in contact with the filtering surfaces, where it will be deposited in particles upon such surfaces and will itself form a filtering medium, as the operation is continued, through which the fluid and worthless portions of the residuums can readily pass while the valuable constituents are retained. If the residuums mixed with the granular or pulverized material are forced into the filter-press or other filter apparatus by an intermittently-operating pump or other device, the granular material will be deposited in successive layers with the solid portions of the residuums, while if introduced in a continuous stream, so as to give a constant pressure and contact upon the filtering surfaces, the granular material will be deposited in a constant succession of particles mixed with the valuable constituents of the residuums; but in both cases it operates to form or build up a filtering medium. After the filtration is completed the solid retained portion may be dried in any desired manner, or it may be fed to stock in its moist condition. The fluid portion may be subjected to evaporation or other treatment, as desired, to recover any valuable matter held in solution.

What is claimed as new is—

The hereinbefore-described process or method of treating the residuums of the distillation of grain or other similar residuums, which consists in mixing with the residuums granular or pulverized nutritious material, and while it is held in suspension subjecting the mass to filtration, whereby the granular or pulverized nutritious material is deposited during the filtering operation and forms a filtering medium by which the fluids are separated from the solid and nutritious matters.

EDWARD M. COOK.

Witnesses:
ROBT. F. GAYLORD,
ROBT. H. DUNCAN.